(12) United States Patent
Watson

(10) Patent No.: US 12,135,459 B2
(45) Date of Patent: Nov. 5, 2024

(54) SYSTEM FOR FIBER CONNECTOR ASSEMBLY

(71) Applicant: Ortronics, Inc., New London, CT (US)

(72) Inventor: Matthew Cameron Watson, Morganton, NC (US)

(73) Assignee: Legrand DPC, LLC, West Hartford, CT (US)

( * ) Notice: Subject to any disclaimer, the term of this patent is extended or adjusted under 35 U.S.C. 154(b) by 338 days.

(21) Appl. No.: 17/838,906

(22) Filed: Jun. 13, 2022

(65) Prior Publication Data
US 2023/0400645 A1     Dec. 14, 2023

(51) Int. Cl.
*G02B 6/38* (2006.01)

(52) U.S. Cl.
CPC .................................. *G02B 6/387* (2013.01)

(58) Field of Classification Search
None
See application file for complete search history.

(56) References Cited

U.S. PATENT DOCUMENTS

| | | | |
|---|---|---|---|
| 10,444,441 B1* | 10/2019 | Ho | G02B 6/387 |
| 2005/0226567 A1* | 10/2005 | Koreeda | G02B 6/3879 |
| | | | 385/71 |
| 2009/0116794 A1* | 5/2009 | Katagiyama | G02B 6/3898 |
| | | | 385/81 |
| 2015/0192744 A1* | 7/2015 | Lin | G02B 6/3825 |
| | | | 385/75 |
| 2018/0252872 A1* | 9/2018 | Chen | G02B 6/3893 |
| 2023/0314729 A1* | 10/2023 | Ukita | G02B 6/32 |
| | | | 385/134 |

\* cited by examiner

*Primary Examiner* — Jerry Rahll
(74) *Attorney, Agent, or Firm* — McCarter & English, LLP

(57) ABSTRACT

An example system for housing disassembly is provided. The system includes a first component including a platform defining an interior space configured and dimensioned to at least partially receive a first side of a housing including a first set of latching points. The system includes blades extending from the platform of the first component. The blades are disposed in a pattern to align with the first set of latching points of the housing when the housing is at least partially received in the interior space of the platform. Compressing the platform towards the housing or compressing the housing towards the platform disengages the first set of latching points of the housing with the blades to disassemble the housing.

20 Claims, 5 Drawing Sheets

SYSTEM FOR FIBER CONNECTOR ASSEMBLY

BACKGROUND

A variety of electrical connectors are used in the telecommunications industry. One example of such connectors is fiber optic connectors. In general, these connectors include a housing or backshell formed from two or more sections/halves. Latching points located around the perimeter of the backshell halves and/or in the interior of the backshell halves are used to secure the backshell halves together during assembly of the connector. If re-working or maintenance of the connectors is needed, it may be difficult to unlatch all of the latch points without damaging the backshell halves. For example, the latch points may be pried apart one at a time using a sharp tool, such as a knife or a flathead screwdriver. During this process, the flanges/latching elements associated with the backshell halves and/or the backshell halves themselves may be damaged such that the backshell halves can no longer be secured relative to each other. This results in discarding and replacement of the backshell halves.

SUMMARY

Embodiments of the present disclosure provide an exemplary system for housing disassembly for connectors, such as fiber optic connectors. The system includes two components configured to be positioned on opposing sides of the connector such that blades of the respective components align with latching points on opposing sides of the housing. Compression of the components towards each other (or compressing one of the components towards the other component) simultaneously (or substantially simultaneously) engages the blades with each of the latching points of the housing to disengage the latching points. The backshell halves of the housing can thereby be disengaged from each other in a single action, providing an efficient means for disassembly of the housing and preventing damage to the housing. If latching points are located only on one side of the housing, a single component may be used to disengage the latching points. The system discussed herein enables the creation of more secure and tamper-evident enclosure designs, and removes the disadvantage of difficulty in disassembly normally found in traditional hermaphroditic housing designs, thereby lowering component and tooling costs. Although discussed herein with respect to a fiber optic connector housing, it should be understood that the system can be adapted for disassembly of any two-piece snap-together plastic housing as long as the latching points are accessible from the top and/or bottom of the housing. In some embodiments, the system can be used to disassembly a two-piece plastic enclosure, such as an enclosure used to house electrical components.

In accordance with embodiments of the present disclosure, an exemplary system for connector disassembly is provided. The system includes a first component including a platform with blades extending therefrom. The first component is configured and dimensioned to at least partially receive thereon a connector including a housing with a first side including a first set of latching points and an opposing side with a second set of latching points. The blades of the first component are configured to align with the first set of latching points of the connector. The system includes a second component including a platform with blades extending therefrom. The second component is configured and dimensioned to be positioned over the opposing side of the connector such that the blades of the second component align with the second set of latching points of the connector. Compressing the first and second components towards each other disengages the first and second set of latching points of the connector to disassemble the housing of the connector.

In some embodiments, the first and second components can each include a lower layer upon which the respective platform is disposed. The lower layer and the platform can collectively define the respective base of the first and second components. Compressing the first and second components towards each other engages the blades of the first component with the first set of latching points of the connector and engages the blades of the second component with the second set of latching points of the connector.

In some embodiments, the blades of the first component can be integrally molded with the platform of the first component, and the blades of the second component can be integrally molded with the platform of the second component. In some embodiments, the platform of each of the first and second components can include openings formed therein. Each of the openings is configured to removably receive one of the respective blades. In some embodiments, the blades can be fabricated from a different material than a material of the first and second components (e.g., metal blades and plastic components). The first and second components can be identical to each other.

In some embodiments, the blades of the first and second components can each include two blades disposed on one side of the platform and two blades disposed on an opposing side of the platform. In some embodiments, the first and second components can each include an indexing feature associated with each of the blades of the first and second components. A surface area defined between the indexing feature of each of the blades of the first and second components can be complementary to a surface area of the connector. The indexing feature associated with each of the blades of the first component can align the first set of latching points of the connector with the blades of the first component, and the indexing feature associated with each of the blades of the second component can align the second set of latching points of the connector with the blades of the second component.

In some embodiments, the platform includes a proximal end and a distal end, and the proximal end can define a stepped configuration. Each of the blades of the first and second components can include a tapered section extending towards a narrowed top section for alignment and engagement with the respective latching points of the connector.

In accordance with embodiments of the present disclosure, an exemplary method of connector disassembly is provided. The method includes positioning a connector on a first component of a system for connector disassembly. The connector includes housing with a first set of latching points and an opposing side including a second set of latching points. The first component includes a platform with blades extending therefrom. The blades of the first component are configured to align with the first set of latching points of the connector. The method includes positioning a second component of the system for connector disassembly over the opposing side of the connector such that blades of the second component align with the second set of latching points of the connector. The blades extend from a platform of the second component. The method includes compressing the first and second components towards each other to disengage the first and second set of latching points of the connector to disassemble the housing of the connector.

Compressing the first and second components towards each other includes engaging the blades of the first component with the first set of latching points of the connector and engaging the blades of the second component with the second set of latching points of the connector to disassemble the housing of the connector. The housing of the connector can include a first backshell half and a second backshell half detachably engaged with each other, and compressing the first and second components towards each other can result in disengagement of the first and second backshell halves from each other.

In some embodiments, the method can include removing and/or interchanging the blades from openings formed in each of the first and second components. In some embodiments, the first and second components can each include an indexing feature associated with each of the blades of the first and second components. The method can include aligning the first set of latching points of the connector with the blades of the first component with the indexing feature associated with each of the blades of the first component, and aligning the second set of latching points of the connector with the blades of the second component with the indexing feature associated with each of the blades of the second component.

In accordance with embodiments of the present disclosure, an exemplary system for connector disassembly is provided. The system includes a connector including a housing formed by a first backshell half and a second backshell half. The first and second backshell halves are detachably coupled to each other by a first set of latching points on a first side of the housing and a second set of latching points on an opposing side of the housing. The system includes a first component including a platform with blades extending therefrom. The first component is configured and dimensioned to at least partially receive thereon the connector such that the blades of the first component align with the first set of latching points of the connector. The system includes a second component including a platform with blades extending therefrom. The second component is configured and dimensioned to be positioned over the opposing side of the connector such that the blades of the second component align with the second set of latching points of the connector. Compressing the first and second components towards each other disengages the first and second set of latching points of the connector to disassemble the first backshell half from the second backshell half.

In accordance with embodiments of the present disclosure, an exemplary system for housing disassembly is provided. The system includes a first component including a platform with blades extending therefrom. The first component defines an interior space configured and dimensioned to at least partially receive therein a housing (e.g., of a fiber optic connector, or the like) with a first side including a first set of latching points and an opposing side with a second set of latching points. The blades of the first component are disposed in a pattern to align with the first set of latching points of the housing. The system includes a second component including a platform with blades extending therefrom. The second component defines an interior space configured and dimensioned to be positioned over the opposing side of the housing. The blades of the second component are disposed in a pattern to align with the second set of latching points of the housing. Compressing at least one of the first and second components towards each other disengages the first and second set of latching points of the housing with the blades of the respective first and second components to disassemble the housing.

In some embodiments, the first and second components can each include a lower layer upon which the respective platform is disposed. In such embodiments, the lower layer and the platform define the base of the first and second components. Compressing at least one of the first and second components towards each other engages the blades of the first component with the first set of latching points of the connector and simultaneously (or substantially simultaneously) engages the blades of the second component with the second set of latching points of the housing.

In some embodiments, the blades of the first component can be integrally molded with the platform of the first component, and the blades of the second component can be integrally molded with the platform of the second component. In some embodiments, the platform of each of the first and second components can include openings formed therein, each of the openings configured to removably receive one of the respective blades. In such embodiments, the blades can be fabricated from a different material than a material of the first and second components to provide for longevity of the structures engaging with the housing latching points. In some embodiments, the material of the replaceable blades can be the same as the material of the housing.

The first and second components can be identical to each other. In some embodiments, the blades of the first and second components each include two blades disposed on one side of the platform and two blades disposed on an opposing side of the platform. In some embodiments, the first and second components can each include an indexing feature associated with each of the blades of the first and second components. Inwardly facing surfaces of the collective indexing features define the respective interior space of the first and second components. The interior space defined between the indexing feature of each of the blades of the first and second components is complementary to a configuration of the housing. The indexing feature associated with each of the blades of the first component aligns (i.e., assists with alignment of) the first set of latching points of the housing with the blades of the first component, and the indexing feature associated with each of the blades of the second component aligns (i.e., assists with alignment of) the second set of latching points of the housing with the blades of the second component.

In some embodiments, the platform can include a proximal end and a distal end, the proximal end defining a stepped configuration. In some embodiments, each of the blades of the first and second components can include a tapered section extending towards a narrowed top section for alignment and engagement with the respective latching points of the housing.

In accordance with embodiments of the present disclosure, an exemplary method of housing disassembly is provided. The method includes positioning a housing at least partially within an interior space of a first component of a system for housing disassembly. The housing including a first side with a first set of latching points and an opposing side with a second set of latching points. The first component includes a platform with blades extending therefrom. The blades of the first component are disposed in a pattern to align with the first set of latching points of the housing. The method includes positioning a second component of the system for housing disassembly over the opposing side of the housing such that the housing is at least partially received in an interior space defined of the second component. The second component includes a platform with blades extending therefrom. The blades of the second component are disposed in a pattern to align with the second set of latching points of the housing. The method includes compressing at least one of the first and second components towards each other to disengage the first and second set of latching points of the housing with the blades of the respective first and second components to disassemble the housing.

Compressing at least one of the first and second components towards each other can include engaging the blades of the first component with the first set of latching points of the housing and simultaneously (or substantially simultaneously) engaging the blades of the second component with the second set of latching points of the housing to disassemble the housing. In some embodiments, the housing can include a first backshell half and a second backshell half detachably engaged with each other, and compressing at least one of the first and second components towards each other results in disengagement of the first and second backshell halves from each other.

In some embodiments, the method can include removing the blades from openings formed in each of the first and second components. The first and second components can each include an indexing feature associated with each of the blades of the first and second components. Inwardly facing surfaces of the collective indexing features define the respective interior space of the first and second components. The method can include aligning the first set of latching points of the housing with the blades of the first component with the indexing feature associated with each of the blades of the first component, and aligning the second set of latching points of the housing with the blades of the second component with the indexing feature associated with each of the blades of the second component.

In accordance with embodiments of the present disclosure, an exemplary device for housing disassembly is provided. The device includes a platform defining an interior space configured and dimensioned to at least partially receive a housing with latching points. The device includes blades extending from the platform in a spaced manner. The blades are disposed in a pattern to align with the latching points of the housing when the housing is at least partially received in the interior space of the platform. Compressing the platform towards the housing or compressing the housing towards the platform disengages the latching points of the housing with the blades to disassemble the housing.

In accordance with embodiments of the present disclosure, an exemplary system for housing disassembly is provided. The system includes a housing formed by a first backshell half and a second backshell half. The first and second backshell halves are detachably coupled to each other by a first set of latching points on a first side of the housing and a second set of latching points on an opposing side of the housing. The system includes a first component including a platform with blades extending therefrom. The first component defines an interior space configured and dimensioned to at least partially receive therein the housing. The blades of the first component are disposed in a pattern to align with the first set of latching points of the housing. The system includes a second component including a platform with blades extending therefrom. The second component defines an interior space configured and dimensioned to be positioned over the opposing side of the housing. The blades of the second component are disposed in a pattern to align with the second set of latching points of the housing. Compressing at least one of the first and second components towards each other disengages the first and second set of latching points of the housing with the blades of the respective first and second components to disassemble the first backshell half from the second backshell half.

In accordance with embodiments of the present disclosure, an exemplary device or system for housing disassembly is provided. The system includes a first component including a platform defining an interior space configured and dimensioned to at least partially receive a first side of a housing including a first set of latching points. The system includes blades extending from the platform of the first component. The blades are disposed in a pattern to align with the first set of latching points of the housing when the housing is at least partially received in the interior space of the platform. Compressing the platform towards the housing or compressing the housing towards the platform disengages the first set of latching points of the housing with the blades to disassemble the housing.

The housing can include a second side opposing the first side, the second side including a second set of latching points. The system can include a second component including a platform defining an interior space configured and dimensioned to be positioned over the second side of the housing. The second component can include blades extending from the platform. The blades can be disposed in a pattern to align with the second set of latching points of the housing when the second component is positioned over the second side of the housing. In such embodiments, compressing at least one of the first and second components towards each other disengages the first and second set of latching points of the housing with the blades of the respective first and second components to disassemble the housing.

The first component can include an indexing feature associated with each of the blades. Inwardly facing surfaces of the collective indexing features define the respective interior space of the first component. The interior space defined between the indexing feature of each of the blades of the first component can be complementary to a configuration of the housing. The indexing feature associated with each of the blades of the first component can align the first set of latching points of the housing with the blades of the first component.

In accordance with embodiments of the present disclosure, an exemplary method of housing disassembly is provided. The method includes positioning a housing at least partially within an interior space of a first component of a system for housing disassembly. The housing includes a first side with a first set of latching points. The first component includes a platform with blades extending therefrom. The blades of the first component are disposed in a pattern to align with the first set of latching points of the housing. The method includes compressing the platform towards the housing or compressing the housing towards the platform to disengage the first set of latching points of the housing with the blades of the first components to disassemble the housing.

The housing can include a second side opposing the first side. The second side can include a second set of latching point. In such embodiments, the method can include positioning a second component of the system for housing disassembly over the second side of the housing such that the housing is at least partially received in an interior space defined of the second component. The second component can include a platform with blades extending therefrom. The blades of the second component can be disposed in a pattern to align with the second set of latching points of the housing. The method can include compressing at least one of the first and second components towards each other to disengage the first and second set of latching points of the housing with the blades of the respective first and second components to disassemble the housing.

The housing can include a first backshell half and a second backshell half detachably engaged with each other. Compressing the platform towards the housing or compressing the housing towards the platform results in disengagement of the first and second backshell halves from each other. The first component can include an indexing feature associated with each of the blades. Inwardly facing surfaces of the collective indexing features can define the respective interior space of the first component. The method can include aligning the first set of latching points of the housing with the blades of the first component with the indexing feature associated with each of the blades of the first component.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the system for housing disassembly, reference is made to the accompanying figures, wherein.

DETAILED DESCRIPTION

Figure 1:
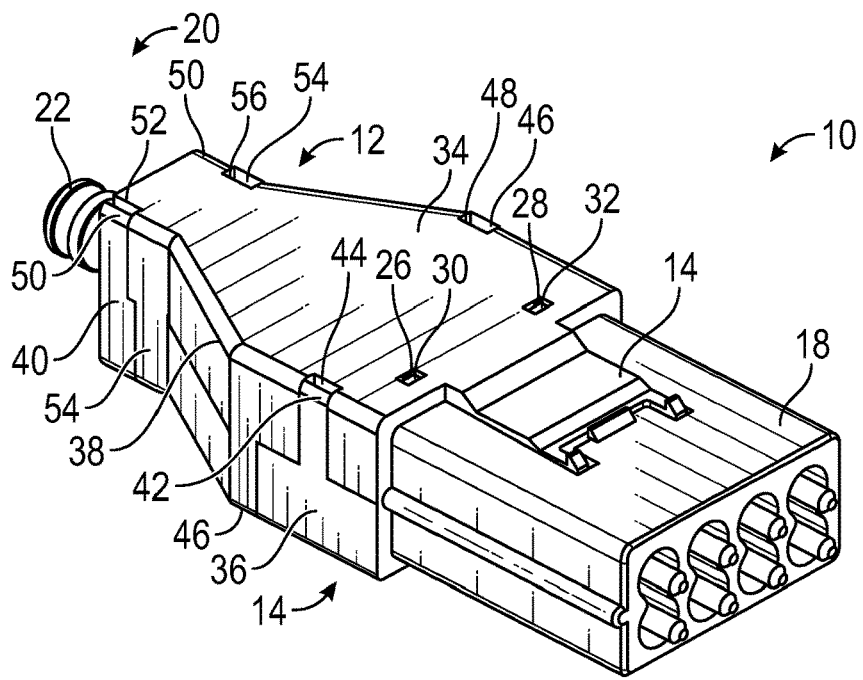
FIG. 1 is a perspective view of an electrical connector and housing in an exemplary embodiment.

FIG. 1 is a perspective view of an electrical connector 10 (e.g., a fiber optic connector, or the like) with a housing capable of being disassembled by the exemplary system discussed herein. Although discussed with respect to a housing for a fiber optic connector, it should be understood that the exemplary system for housing disassembly can be used with any connector including two-piece housing/backshell construction. For example, the position of the blade inserts discussed herein is intended to align (or substantially align) with the latching points of the first optic connector housing of FIG. 1. However, the system can be reconfigured by positioning the blade inserts to align with latching points of another housing including a two-piece housing/backshell construction.

The connector 10 of FIG. 1 includes housing formed by a first backshell half 12 (e.g., a top backshell or housing section) and a second backshell half 14 (e.g., a bottom backshell or housing section) detachably secured or latched relative to each other. At a proximal end 16 of the connector 10, the backshell halves 12, 14 secure around a ferrule housing 18. At a distal end 20 of the connector 10, the backshell halves 12, 14 secure around a crimping component 22. In some embodiments the backshell halves 12, 14 can both include an extension 24 (not visible for backshell half 14) assisting with coupling to the ferrule housing 18. At or near the proximal end, both backshell halves 12, 14 can include openings or slots 26, 28 configured and dimensioned to receive complementary tabs/extensions 30, 32 of the ferrule housing 18 in a snapping engagement to assist with assembly of the housing.

The backshell halves 12, 14 can be identical to each other such that the halves 12, 14 can be flipped and interchanged to simplify assembly of the housing. Each backshell half 12, 14 includes four latch points, resulting in eight total latch points for engagement of the backshell halves 12, 14 to each other (e.g., first and second sets of latching points). Each backshell half 12, 14 includes a body with a base section 34, and opposing side surfaces 36, 38, 40 extending substantially perpendicularly from the base section 34. The side surfaces include a first pair of side surfaces 36 on either side of the base section 34 extending from the proximal end towards the distal end of the base surface 34, a second pair of side surfaces 40 on either side of the base section 34 extending from the distal end towards the proximal end of the base section 34, and a third pair of side surfaces 38 on either side of the base section 34 and extending between/connecting the first and second pair of side surfaces 36, 40. The width between the side surfaces 36 can be dimensioned greater than the width of the side surfaces 40, with the side surfaces 38 tapering to accommodate the width difference.

One of the side surfaces 36 includes a latch extension 42 and an edge of the base section 34 includes a complementary groove 44 configured receive a hook-like component of the extension 42 in a snapping manner. The opposing side surface 36 includes a similar latch extension 46 with a hook-like component configured to engage with a complementary groove 48 formed in the base section 34. The latch extensions 42, 46 and complementary grooves 44, 48 are offset relative to each other to allow for flipping and interchangeability of the backshell halves 12, 14.

One of the side surfaces 40 includes a latch extension 50 and an edge of the base section 34 includes a complementary groove 52 configured to receive a hook-like component of the extension 50 in a snapping manner. The opposing side surface 40 includes a similar latch extension 54 with a hook-like component configured to engage with a complementary groove 56 formed in the base section 34. The latch extensions 50, 54 and complementary grooves 52, 56 are offset relative to each other along a central longitudinal axis of the housing of the connector 10 to allow for flipping and interchangeability of the backshell halves 12, 14. Although the side surfaces 38 do not include a latch extension/groove, in some embodiments, the electrical connector 10 can include additional latching points.

Figure 2:
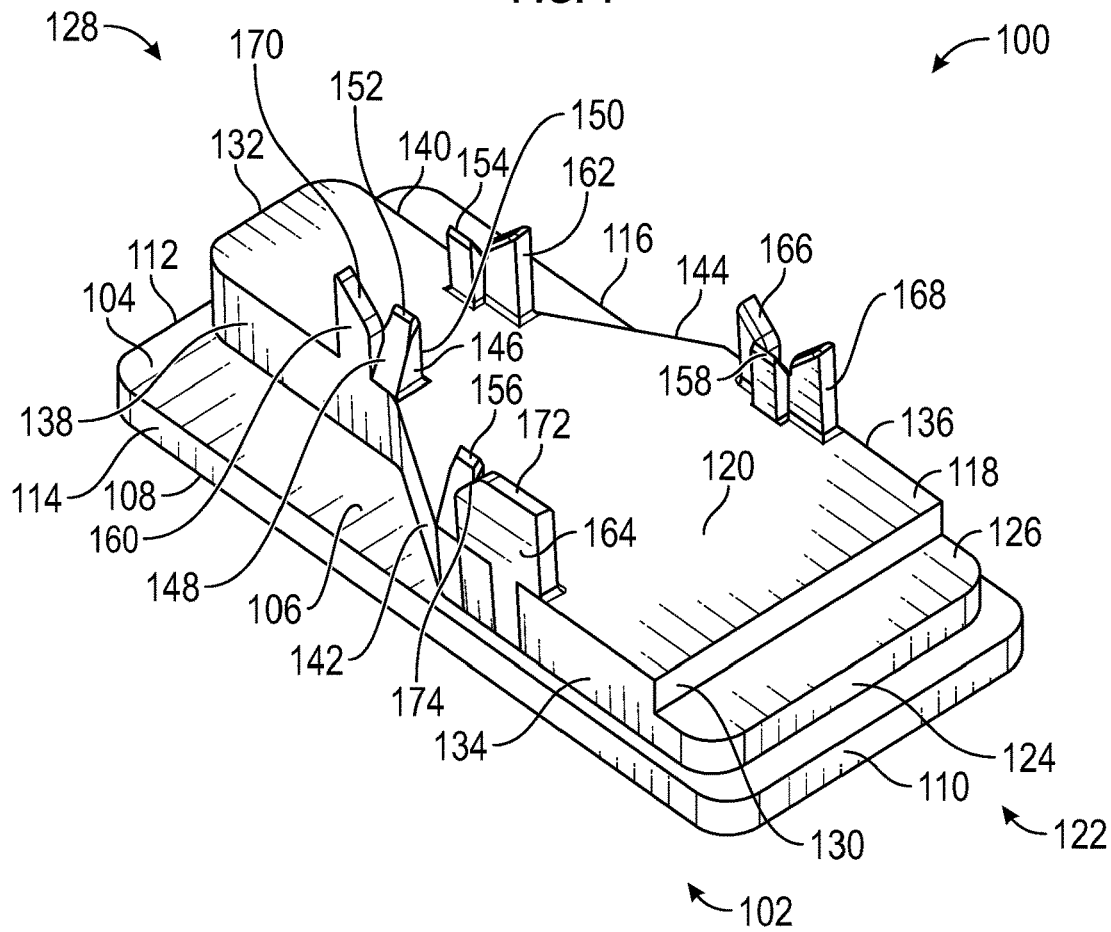
FIG. 2 is a perspective view of a first component of a system for housing disassembly in an exemplary embodiment.

FIG. 2 is a perspective view of a first component 100 (e.g., a first tool component) of a system for housing disassembly. It should be understood that the second component 200 (e.g., a second tool component) of the system (see, e.g., FIG. 7) is identical to the first component 100 such that the components 100, 200 can be flipped and interchanged to simplify disassembly of the housing of the connector 10. The components 100, 200 collectively are referred to herein as a system for disassembly of the housing. As discussed herein, the first component 100 can receive the housing of the connector 10 thereon and the second component 200 can be placed over the opposing side of the housing of the connector 10, thereby forming a two-part or piece tool for disassembly of the housing. The system includes alignment features that ensure the housing of the connector 10 is precisely positioned between the components 100, 200 in a repeated manner, and features for simultaneously decoupling all latch points of the housing of the connector 10 with a compressive motion (e.g., compressing the first and second components 100, 200 together).

The system includes the two components 100, 200 each defining a respective interior space dimensioned greater than the perimeter/configuration of the connector 10 such that the components 100, 200 can receive the housing of the connector 10 therebetween, and blade inserts at each component 100, 200 correspond to the latch points of the housing. In some embodiments, the components 100, 200 can include indexing features/structures that enable precise positioning of the housing relative to the blades. The inwardly facing surfaces of the indexing features (e.g., the surfaces facing the indexing features on the opposing side of the platform) define an interior space dimensioned complementary to the housing of the connector 10 to guide positioning of the housing in a position in which the latch points of the housing are aligned with the corresponding blades. By sandwiching the housing of the connector 10 between the two components 100, 200 and pressing on the base of the top component 200 (or squeezing the two components 100, 200 together), all latch points are decoupled at the same time, allowing for faster disassembly and lower risk of damage to the housing.

With reference to FIG. 2, the component 100 includes a base 102. The base 102 can include first or bottommost layer 104 that defines a substantially planar/flat top surface 106 and an opposing planar/flat bottom surface 108. The layer 104 includes a front surface 110, an opposing rear surface 112, and opposing side surfaces 114, 116. The layer 104 therefore defines a substantially rectangular configuration. The layer 104 supports a platform 118 thereon. The platform 118 can be fabricated as a separate component from the layer 104 and fixed thereon, or can be integrally formed with the layer 104.

The platform 118 defines a substantially planar/flat top surface 120 configured to at least partially support the housing of the connector 10 thereon. The proximal end 122 of the platform 118 defines a stepped structure including a first front surface 124 perpendicularly extending from the top surface 106 of the layer 104, a step, horizontal or intermediate surface 126 perpendicularly extending from the front surface 124 towards the distal end 128 of the component 100, and a second front surface 130 perpendicularly extending from the intermediate surface 126 up to the top surface 120. The distal end 128 of the platform 118 defines a rear surface 132 extending perpendicularly from the top surface 106 of the layer 104 up to the top surface 120 of the platform 118. The width of the surfaces 124, 126, 130 can be dimensioned equally and wider than the surface 132. The stepped structure at the proximal end 122 of the platform 118 can provide clearance for an optional tool (not shown) that can be used to retain the internal components of the connector 10 during disassembly of the housing.

The side surfaces of the platform 118 can generally define a configuration similar to the configuration defined by the side surfaces 36, 38, 40 of the housing of the connector 10. For example, the platform 118 can include proximal, opposing side surfaces 134, 136 extending perpendicularly from the top surface 106 of the layer 104, and extending from the front surface 124 towards the distal end 128. The platform 118 includes distal, opposing side surfaces 138, 140 extending perpendicularly from the top surface 106 of the layer 014, and extending from the rear surface 132 towards the proximal end 122. The platform 118 includes intermediate, opposing side surfaces 142, 144 extending perpendicularly from the top surface 106 of the layer 104. Based on the dimensional difference of the platform 118 at the proximal and distal ends 122, 128, the side surfaces 142, 144 taper and are angled relative to the side surfaces 134, 136, 138, 140.

The component 100 includes a first blade 146 (e.g., an extension) disposed at or near the connection between the walls 138, 142 and extending perpendicularly from the top surface 120. The blade 146 includes an outwardly facing surface 148 and an opposing, inwardly facing surface 150. The surface 148 tapers inwardly towards a narrow top point or edge 152, and the surface 150 extends perpendicularly from the top surface 120 towards the edge 152. The edge 152 can define a narrowed, flat section substantially similar to an edge of a flathead screwdriver. The position of the edge 152 is intended to align and engage with the groove 56 of the housing of the connector for disengagement of the latch extension 54 from the groove 56.

The component 100 includes a second blade 154 disposed on the opposing side of the component 100 from the first blade 146, with the second blade 154 disposed at or near the connection between the walls 140, 144. The position of the second blade 154 is offset along the central longitudinal axis of the component 100 (i.e., not in the same, aligned position as the blade 146), and corresponds with the position of the groove 52 of the housing of the connector 10. The blade 154 defines a substantially similar configuration as the blade 146, including an outwardly facing tapered surface 148, an inwardly facing flat surface 150, and a top edge 152. The surfaces 150 of the blades 146, 154 face each other. The position of the edge 152 of the blade 154 is intended to align and engage with the groove 52 of the housing of the connector 10 for disengagement of the latch extension 50 from the groove 52.

The component 100 includes a third blade 156 disposed at or near the connection between the walls 134, 142 and extending perpendicularly from the top surface 120. The blade 156 defines a substantially similar configuration as the blade 146, including an outwardly facing tapered surface 148, an inwardly facing flat surface 150, and a top edge 152. The position of the edge 152 of the blade 156 is intended to align and engage with the groove 48 of the housing of the connector for disengagement of the latch extension 46 from the groove 48.

The component 100 includes a fourth blade 158 disposed at or near the connection between the walls 136, 144, and on the opposing side of the component 100 from the blade 156. The position of the blade 158 is offset along the central longitudinal axis of the component 100 (i.e., not in the same, aligned position as the blade 156), and corresponds with the position of the groove 44 of the housing of the connector 10. The blade 158 defines a substantially similar configuration as the blade 146, including an outwardly facing tapered surface 148, an inwardly facing flat surface 150, and a top edge 152. The position of the edge 152 of the blade 158 is intended to align and engage with the groove 44 of the housing of the connector 10 for disengagement of the latch extension 42 from the groove 44.

The component 100 can include one or more indexing features/structures associated with each blade 146, 154, 156, 158. For example, an indexing feature 160 can be disposed immediately adjacent to the blade 146, an indexing feature 162 can be disposed immediately adjacent to the blade 154, an indexing feature 164 can be disposed immediately adjacent to the blade 156, and two indexing features 166, 168 can be disposed immediately adjacent to and on either side of the blade 158. In some embodiments, the indexing features can define a substantially similar configuration. In some embodiments, the indexing features can define different configurations. The indexing features 160, 162, 164, 166, 168 can generally define a planar flange extending substantially perpendicularly from the top surface 120 of the platform 118. The inwardly facing surfaces of the indexing features 160, 162, 164, 166, 168 define an interior space dimensioned complementary to the outer dimensions of the housing of the connector 10 such that the housing can be positioned at least partially within the interior space and onto the blades 146, 154, 156, 158.

The indexing feature 160 can be disposed distally from the blade 146, with one of the flat side surfaces aligned with the side surface 138 of the platform 118. The blade 146 can define planar or flat proximal and distal sides, and a tapered top surface 170. The top surface 170 can taper downward towards the blade 146. The indexing feature 162 can be disposed proximally from the blade 154, and can define the same configuration as the indexing feature 160. The top surface 170 of the indexing feature 162 can taper towards the blade 154. The indexing feature 164 can be substantially similar in structure to the indexing feature 160, except for the structural distinctions discussed herein. The indexing feature 164 can be disposed proximally from the blade 156, and includes a flat top surface 172 and a tapered distal surface 174 connecting the top surface 172 with the distal side. The indexing features 166, 168 generally define the same structure as the indexing feature 160. One indexing feature 166 is disposed distally and one indexing feature 168 is disposed proximally relative to the blade 158. The top surfaces of the indexing features 166, 168 taper downward towards the blade 158.

The indexing features 160, 162, 164, 166 assist in guiding the connector 10 into the proper position on the component 100 such that the blades of the component 100 and the grooves of the housing of the connector 10 at the latching points align. The indexing features 160, 162, 164, 166 enable precise placement of the connector 10, and allow the operator to see that the blade 146, 154, 156, 158 tips are aligned with the corresponding latch points on the connector housing. The indexing features 160, 162, 164, 166 therefore ensure proper, repeated positioning of the housing relative to the component 100 prior to disassembly of the housing. In some embodiments, the height of the indexing features 160, 162, 164 166 as measured from the top surface 120 can be dimensioned greater than each of the blades 146, 154, 156, 158, and the surface area or interior space defined within the confines of the indexing features 160, 162, 164, 166 is complementary to the configuration/shape of the connector 10.

Figure 3:
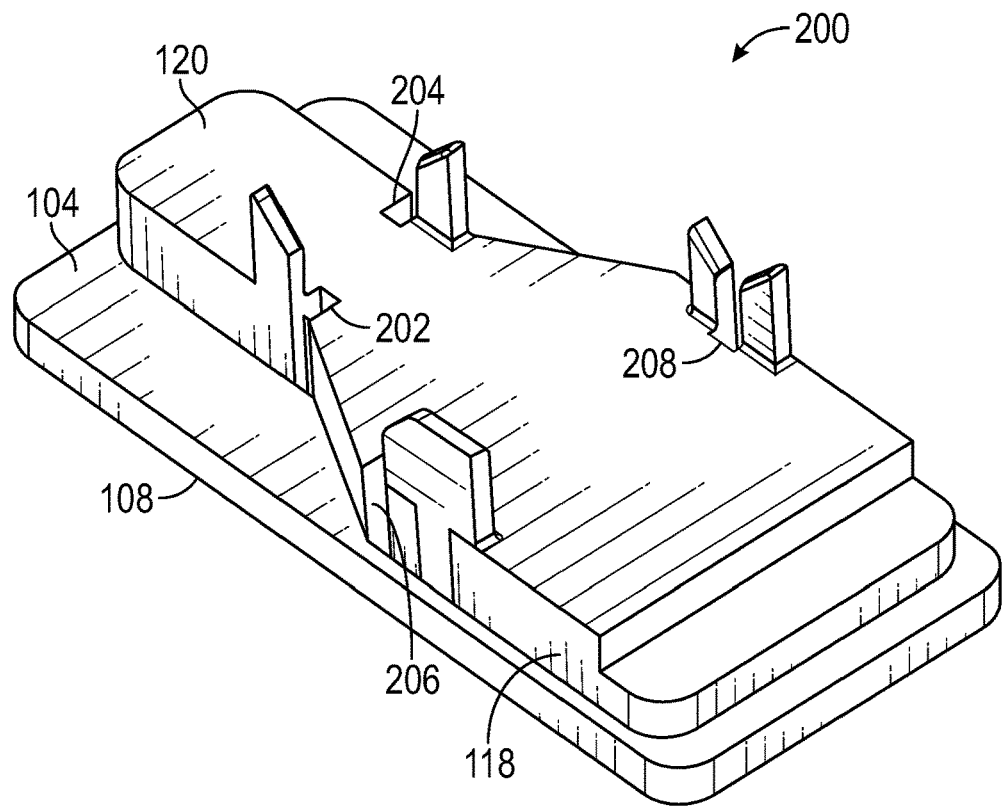
FIG. 3 is a top, perspective view of a first component of a system for housing disassembly in an exemplary embodiment.
Figure 4:
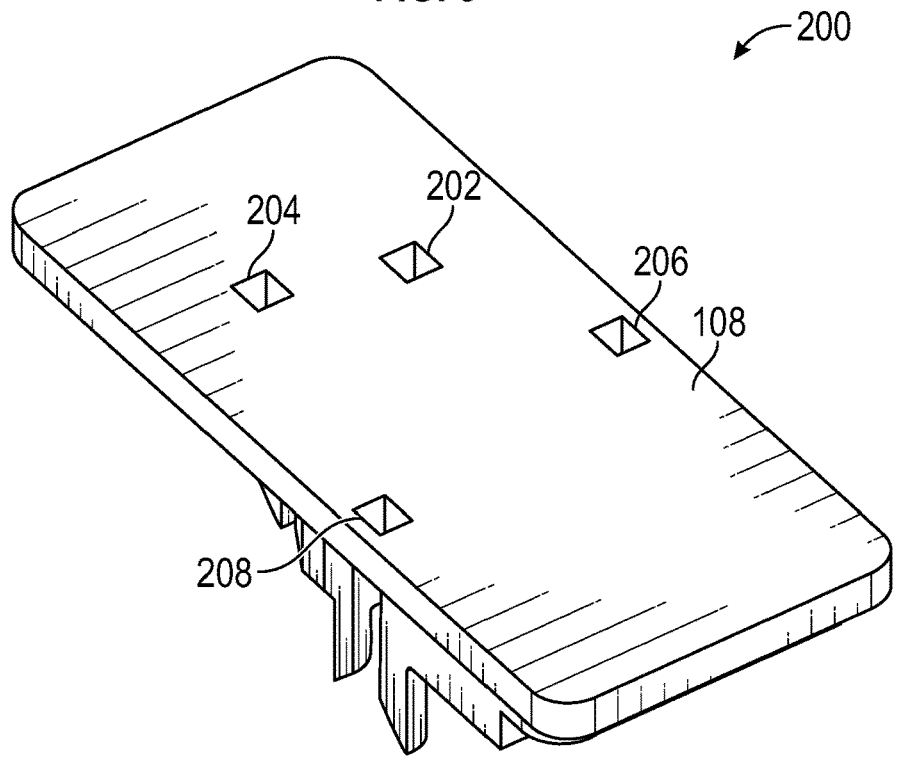
FIG. 4 is a bottom, perspective view of a first component of a system for housing disassembly of FIG. 3.
Figure 5:
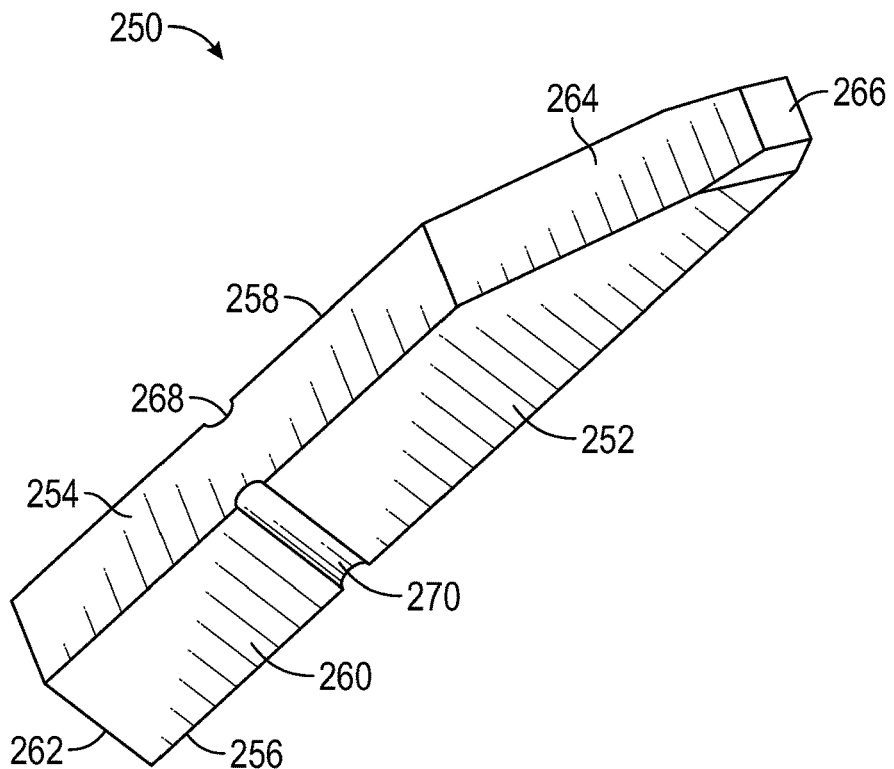
FIG. 5 is a perspective view of a blade insert of a system for housing disassembly of FIG. 3.

In some embodiments, each of the blades 146, 154, 156, 158 can be integrally molded with the platform 118. In some embodiments, the blades can be in the form of a metal insert that could be removably coupled to the platform 118. For example, FIGS. 3 and 4 are top and bottom perspective views of a first component 200 of an exemplary system for connector disassembly. The first component 200 can be substantially similar in structure to the component 100, except for the distinctions noted herein. Rather than including blades that are integrally molded with the platform 118 (e.g., formed from the same plastic material), the component 200 can include openings, cutouts or slots 202, 204, 206, 208 formed in the platform 118 and extending from the top surface 120 of the platform 118 to the bottom surface 108 of the layer 104. The position of the slots 202, 204, 206, 208 substantially corresponds with the position of the blades 146, 154, 156, 158 of the component 100, and each of the slots 202, 204, 206, 208 is configured and dimensioned to receive a blade insert 250 of FIG. 5.

Each blade insert 250 can include a body 252 with an outwardly facing surface 254, an inwardly facing surface 256, and opposing side surfaces 258, 260 that each define substantially flat or planar walls. The distal or bottom surface 262 can be substantially flat or planar, and can define a square configuration. The outwardly facing surface 254 can transition to a tapered section 264 that extends to the proximal or narrow top point/edge 266 that defines a narrowed section substantially similar to an edge of a flathead screwdriver. The side surfaces 258, 260 can include lateral grooves 268, 270 formed therein. The grooves 268, 270 can receive complementary protrusions formed within the slots 202, 204, 206, 208 such that the blade inserts 250 can be snapped or press fit into the slots 202, 204, 206, 208 and remain in position until removal is desired. Such configuration of the component 200 allows for the blade inserts 250 to be interchanged or replaced due to damage or wear over time. For example, the blade inserts 250 can be fabricated from a material different from the material of the component 200, providing for increased durability of the blade inserts 250 (e.g., a plastic component 200 and a metal insert 250, or the like).

Figure 6:
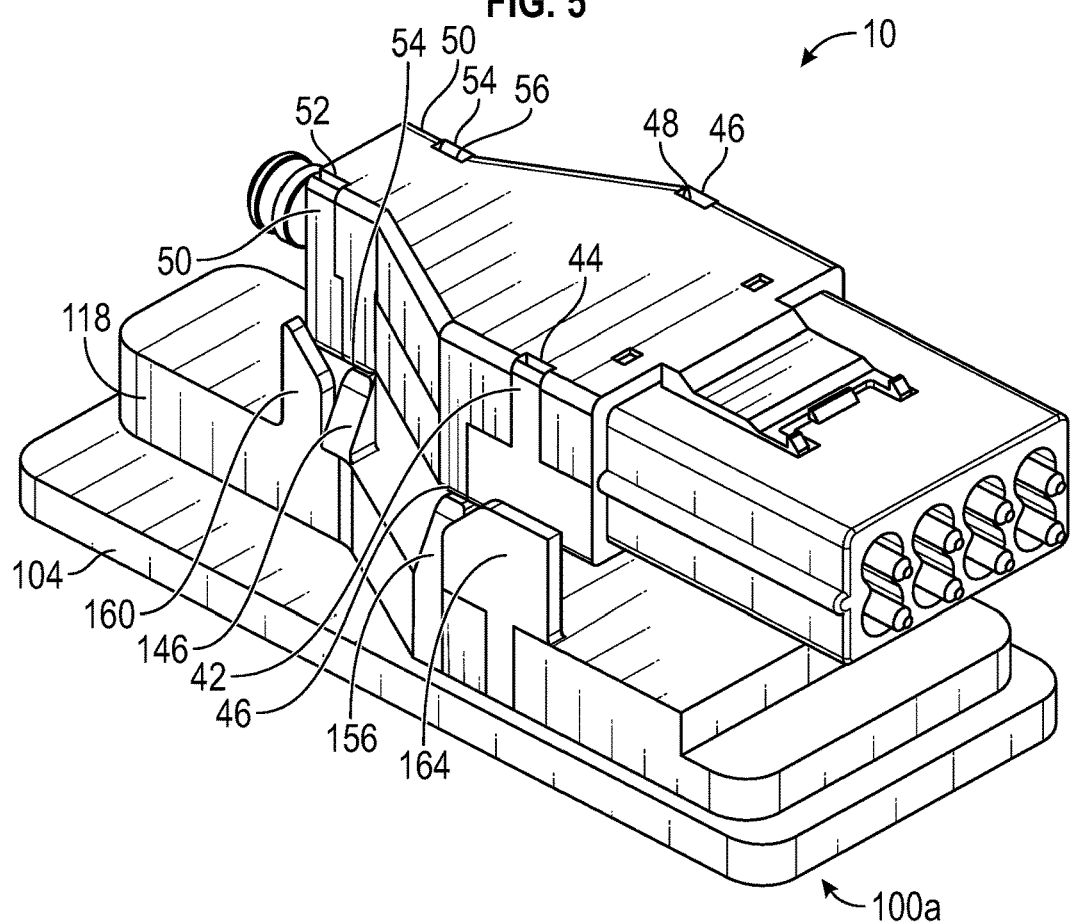
FIG. 6 is a perspective view of a first component of a system for housing disassembly of FIG. 2 and an electrical connector of FIG. 1 positioned on the first component in an exemplary embodiment.

As shown in FIG. 6, in preparation for disassembling the housing of the connector 10, the first component 100a can be positioned on a flat or substantially flat surface such that the blades extend upwardly away from the flat surface. The housing of the connector 10 can then be oriented over and at least partially loaded into the space between the indexing features of the first component 100a. The indexing features assist with positioning of the housing relative to the first component 100a such that each of the blades aligns with and is positioned adjacent to the latching points (e.g., the four latching extensions and complementary grooves) on one side of the connector In this position, the housing rests on each of the respective blades (e.g., elevated above the surface 118).

Figure 7:
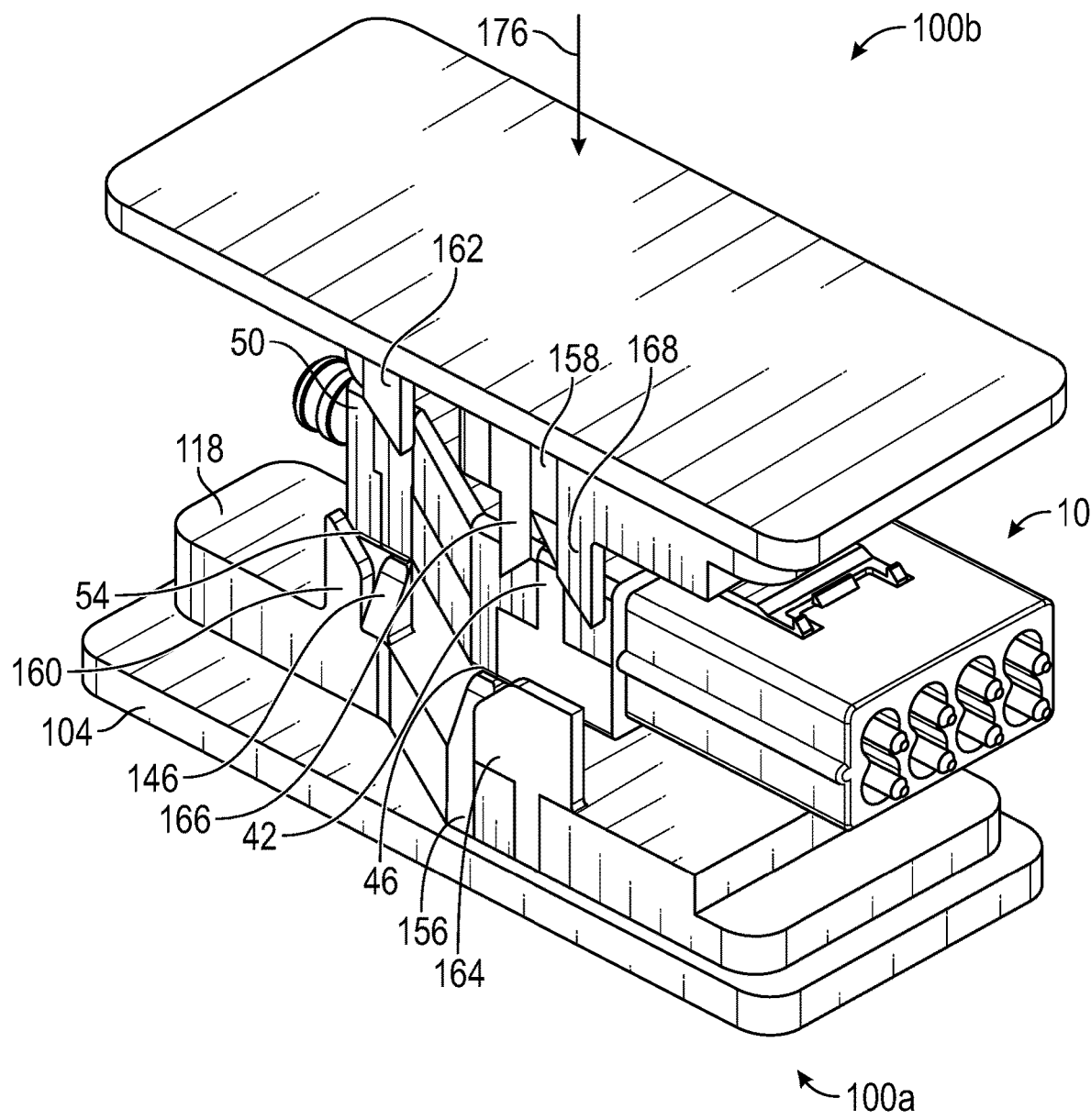
FIG. 7 is a perspective view of an electrical connector of FIG. 1 positioned on a first component of FIG. 2, and a second component of a system for housing disassembly positioned on the electrical connector for disassembly of the housing.

After the housing of the connector 10 has been positioned relative to the first component 100a, as shown in FIG. 7, a second component 100b can be positioned over the top of the housing. The second component 100b can be aligned with the edges of the housing, and the indexing features assist proper assembly between the components 100a, 100b and the housing. A downwardly directed force 176 on the second component 100b simultaneously engages each of the blades with the corresponding latching points on the housing, decoupling all latch points simultaneously and with approximately equal force. In some embodiments, the force 176 can be applied to both the first and second components 100a, 100b to squeeze the components 100a, 100b together. The backshell is therefore disassembled quickly in a single motion without damaging the housing of the connector 10. The system can also assist with maintaining the internal components of the connector 10 (e.g., spring-loaded internal components, or the like) in place immediately after disassembly of the backshell. The components 100 of the system can be reconfigured to allow for disassembly of a variety of connectors (depending on the position and/or number of the latching points).

Figure 8:
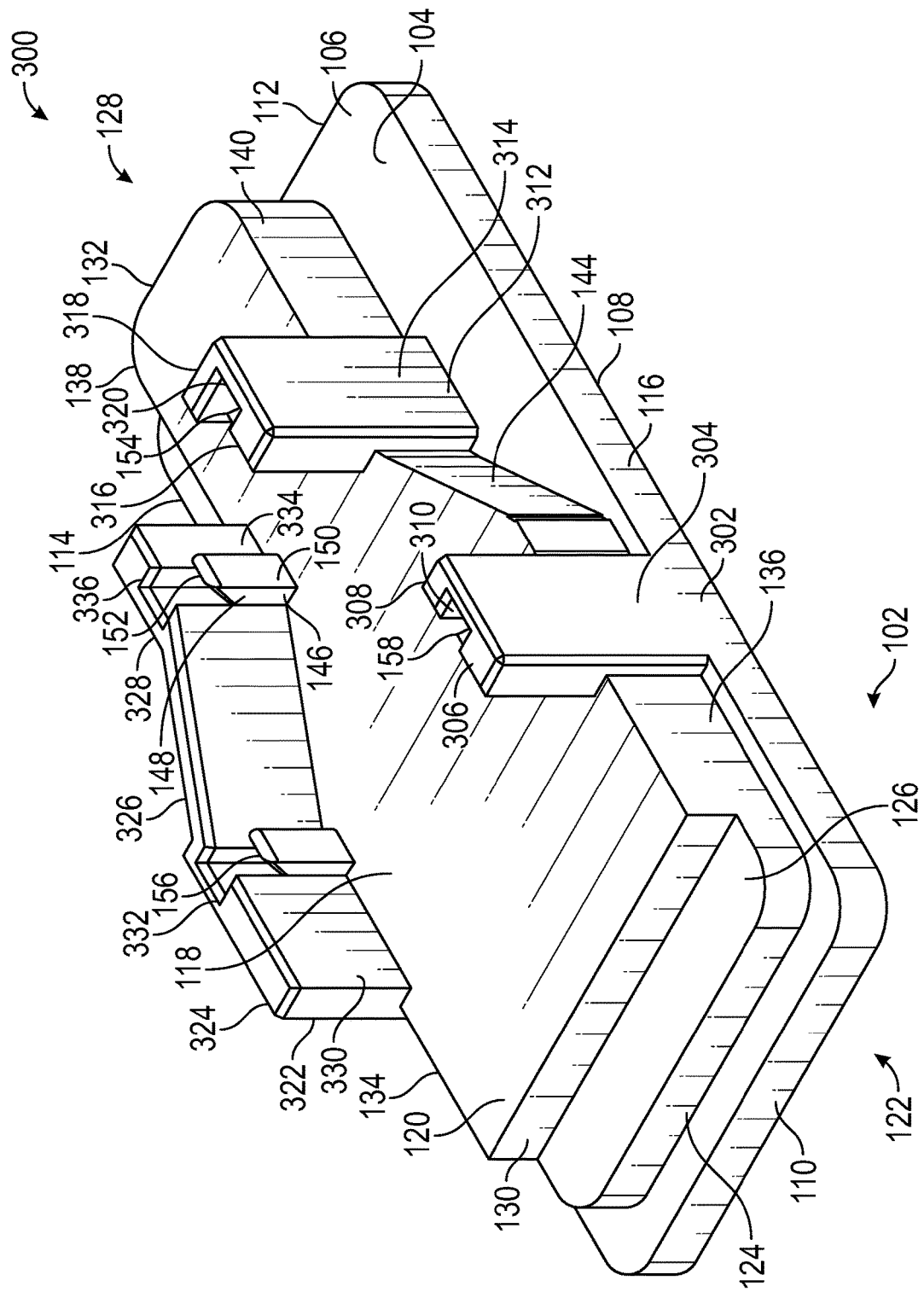
FIG. 8 is a top, perspective view of a first component of a system for housing disassembly in an exemplary embodiment.

FIG. 8 is a top, perspective view of a first component 300 of a system for housing disassembly. The component 300 can be substantially similar in structure and/or function to the component 100. Therefore, similar reference numbers are used to refer to same structures. Rather than including standalone indexing features, the component 300 can include more continuous fences or walls that define the indexing features to improve the alignment aspect of the housing with the component 300. For example, the component 300 can include an indexing feature 302 associated with the blade 158. The indexing feature 302 can include a planar supporting wall 304, and two extensions 306, 308 protruding perpendicularly from the wall 304 towards the inner space defined by the component 300. The extensions 306, 308 protrude the same distance from the wall 304. In-between the extensions 306, 308, the indexing feature 302 includes a rectangular groove 310 extending the height of the indexing feature 302 up to the surface 118. The groove 310 provides clearance around the blade 158. The component 300 similarly includes an indexing feature 312 disposed adjacent to the blade 154. The indexing feature 312 includes the supporting wall 314, two extensions 316, 318, and a rectangular groove 320. The extension 318 protrudes further towards the interior space defined by the component 300.

The component 300 includes a single, continuous indexing feature 322 associated with the blades 146, 156. The indexing feature 322 includes a first wall section 324 that perpendicularly extends from the side surface 134, a second wall section 326 that perpendicularly extends from the side surface 142 (see FIG. 2 for reference; the opposing wall of surface 144), and a third wall section 328 that perpendicularly extends from the side surface 138. The wall section 324 includes an extension 330 protruding inwardly therefrom and a rectangular groove 332 formed in the extension 330 to provide clearance around the blade 156. The wall section 326 extends along the side surface 142 without additional extensions. The wall section 328 includes an extension 334 protruding inwardly therefrom and a rectangular groove 336 formed in the extension 334 to provide clearance around the blade 146. The inner surfaces (e.g., inwardly facing surfaces) of the indexing features 302, 312, 322 are configured and dimensioned complementary to the outer surfaces of the housing of the connector 10, and thereby assist with positioning the housing relative to the blades 146, 154, 156, 158. The continuous wall structure of the indexing features 302, 312, 322 can provide additional support and guidance than independently positioned indexing features.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for housing disassembly, comprising:
   a first component including a platform defining an interior space configured and dimensioned to at least partially receive a first side of a housing including a first set of latching points; and
   blades extending from the platform of the first component, wherein the blades are disposed in a pattern to align with the first set of latching points of the housing when the housing is at least partially received in the interior space of the platform;
   wherein compressing the platform towards the housing or compressing the housing towards the platform disengages the first set of latching points of the housing with the blades to disassemble the housing.

2. The system of claim 1, wherein the housing includes a second side opposing the first side, the second side including a second set of latching points.

3. The system of claim 2, comprising a second component including a platform defining an interior space configured and dimensioned to be positioned over the second side of the housing.

4. The system of claim 3, wherein the second component includes blades extending from the platform, the blades disposed in a pattern to align with the second set of latching points of the housing when the second component is positioned over the second side of the housing.

5. The system of claim 4, wherein compressing at least one of the first and second components towards each other disengages the first and second set of latching points of the housing with the blades of the respective first and second components to disassemble the housing.

6. The system of claim 1, wherein the first component includes an indexing feature associated with each of the blades, and wherein inwardly facing surfaces of the collective indexing features define the respective interior space of the first component.

7. The system of claim 6, wherein the interior space defined between the indexing feature of each of the blades of the first component is complementary to a configuration of the housing.

8. The system of claim 6, wherein the indexing feature associated with each of the blades of the first component aligns the first set of latching points of the housing with the blades of the first component.

9. A system for housing disassembly, comprising:
   a first component including a platform with blades extending therefrom, the first component defining an interior space configured and dimensioned to at least partially receive therein a housing with a first side including a first set of latching points and an opposing side with a second set of latching points, wherein the blades of the first component are disposed in a pattern to align with the first set of latching points of the housing; and
   a second component including a platform with blades extending therefrom, the second component defining an interior space configured and dimensioned to be positioned over the opposing side of the housing, wherein the blades of the second component are disposed in a pattern to align with the second set of latching points of the housing;
   wherein compressing at least one of the first and second components towards each other disengages the first and second set of latching points of the housing with the blades of the respective first and second components to disassemble the housing.

10. The system of claim 9, wherein compressing at least one of the first and second components towards each other engages the blades of the first component with the first set of latching points of the connector and simultaneously engages the blades of the second component with the second set of latching points of the housing.

11. The system of claim 9, wherein the blades of the first component are integrally molded with the platform of the first component, and the blades of the second component are integrally molded with the platform of the second component.

12. The system of claim 9, wherein the platform of each of the first and second components includes openings formed therein, each of the openings configured to removably receive one of the respective blades, and wherein the blades are fabricated from a different material than a material of the first and second components.

13. The system of claim 9, wherein the first and second components are identical to each other.

14. The system of claim 9, wherein:
the first and second components each include an indexing feature associated with each of the blades of the first and second components;
inwardly facing surfaces of the collective indexing features define the respective interior space of the first and second components; and
the indexing feature associated with each of the blades of the first component aligns the first set of latching points of the housing with the blades of the first component, and the indexing feature associated with each of the blades of the second component aligns the second set of latching points of the housing with the blades of the second component.

15. A method of housing disassembly, comprising:
positioning a housing at least partially within an interior space of a first component of a system for housing disassembly, the housing including a first side with a first set of latching points, the first component including a platform with blades extending therefrom, the blades of the first component are disposed in a pattern to align with the first set of latching points of the housing; and
compressing the platform towards the housing or compressing the housing towards the platform to disengage the first set of latching points of the housing with the blades of the first components to disassemble the housing.

16. The method of claim 15, wherein the housing includes a second side opposing the first side, the second side including a second set of latching point, and the method comprises positioning a second component of the system for housing disassembly over the second side of the housing such that the housing is at least partially received in an interior space defined of the second component, the second component including a platform with blades extending therefrom, and wherein the blades of the second component are disposed in a pattern to align with the second set of latching points of the housing.

17. The method of claim 16, comprising compressing at least one of the first and second components towards each other to disengage the first and second set of latching points of the housing with the blades of the respective first and second components to disassemble the housing.

18. The method of claim 15, wherein the housing includes a first backshell half and a second backshell half detachably engaged with each other, and compressing the platform towards the housing or compressing the housing towards the platform results in disengagement of the first and second backshell halves from each other.

19. The method of claim 15, wherein the first component includes an indexing feature associated with each of the blades, and wherein inwardly facing surfaces of the collective indexing features define the respective interior space of the first component.

20. The method of claim 19, comprising aligning the first set of latching points of the housing with the blades of the first component with the indexing feature associated with each of the blades of the first component.

* * * * *

UNITED STATES PATENT AND TRADEMARK OFFICE
CERTIFICATE OF CORRECTION

| | | |
|---|---|---|
| PATENT NO. | : 12,135,459 B2 | Page 1 of 1 |
| APPLICATION NO. | : 17/838906 | |
| DATED | : November 5, 2024 | |
| INVENTOR(S) | : Matthew Cameron Watson | |

It is certified that error appears in the above-identified patent and that said Letters Patent is hereby corrected as shown below:

On the Title Page

In item (54), and in the Specification Column 1, Lines 1-2 please replace the current title "SYSTEM FOR FIBER CONNECTOR ASSEMBLY" with the following title:
SYSTEM FOR HOUSING DISASSEMBLY Signed and Sealed this
Fourth Day of March, 2025

Coke Morgan Stewart
*Acting Director of the United States Patent and Trademark Office*